May 18, 1926.

W. S. BISEL ET AL 1,585,074

RESILIENT TIRE

Filed June 4, 1925

Inventor

W. S. Bisel
G. Baudry

By Lacey & Lacey, Attorneys

Patented May 18, 1926.

1,585,074

UNITED STATES PATENT OFFICE.

WILBER S. BISEL AND GEORGE BAUDRY, OF ATCHISON, KANSAS.

RESILIENT TIRE.

Application filed June 4, 1925. Serial No. 34,900.

This invention relates to an improved resilient tire for motor vehicles and seeks, among other objects, to provide a tire which will eliminate the troubles of punctures and blow-outs while, at the same time, the tire will be possessed of substantially the same cushioning qualities as a pneumatic tire.

The invention seeks, as a further object, to provide a tire having a central cushioning element embodying a plurality of nested spirally wound annular cushioning springs for imparting resiliency to the tire, but wherein means will be provided for preventing undue lateral distortion of said springs.

Another object of the invention is to provide a tire wherein the cushioning element, when embedded in the tire, will be yieldably supported by a core lying within said element, and wherein the tie strap employed for holding the springs of the cushioning element against lateral distortion, will be embedded in said core in such a way as to permit limited independent expansion or contraction of the strap as well as limited independent flexing thereof.

And the invention seeks, as a still further object, to provide a tire wherein the cushioning element may be readily formed on a mandrel and later embedded in the tire and secured when the tire is vulcanized so that a homogenous structure will be produced.

Other and incidental objects will appear hereinafter.

In carrying the invention into effect, we employ a cushioning element which is composed of a plurality of superposed thin layers or wrappings of fabric and rubber embedding a number of spirally wound cushioning springs. In our copending application, filed June 4, 1925, Ser. No. 35,007, we have illustrated the manner in which the cushioning element is formed.

Figure 1:
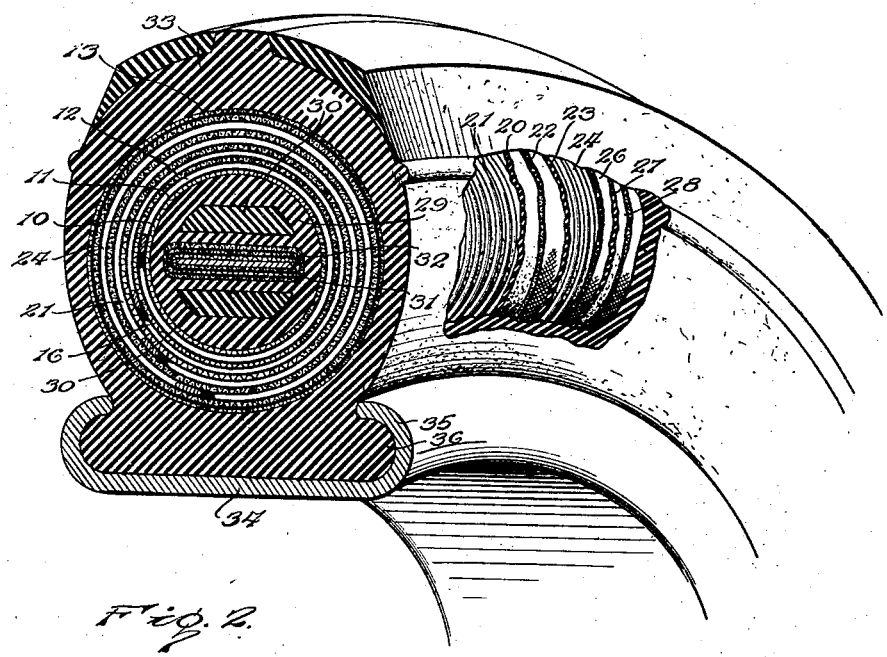
Figure 1 is a sectional perspective view of our improved tire.
Figure 2:
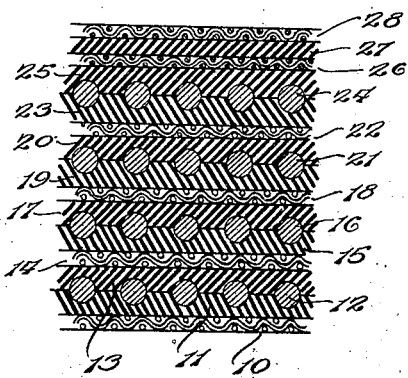
Figure 2 is an enlarged detail sectional view taken through the cushioning element.

Centrally of the cushioning element is a wrapped layer 10 of fabric forming a tube to receive a core, and wrapped about the layer 10 is a layer of soft rubber 11. Wound spirally around the layer 11 of rubber is a coil spring 12 of relatively small resilient wire, and wrapped about said spring, as best seen in Figure 2, is a layer 13 of soft rubber like the layer 11. As will be observed, the layers 11 and 13 of rubber embed the spring and meet between the turns thereof for spacing the turns of the spring apart. Wrapped around the layer 13 of rubber is a layer 14 of fabric about which is wrapped a layer 15 of soft rubber, and wound spirally around the layer 15 of rubber is a coil spring 16 like the coil spring 12. Wrapped about the coil spring 16 is a layer 17 of soft rubber cooperating with the layer of rubber 15 for embedding the spring, and wrapped around the layer 17 of rubber is a layer 18 of fabric. Wrapped around the layer 18 of fabric are superposed layers 19 and 20 of soft rubber, like the layers 15 and 17, and embedded by the layers 19 and 20 is a coil spring 21 like the springs 12 and 16. Wrapped around the layer 20 of rubber is a layer 22 of fabric about which is wrapped a layer 23 of soft rubber, and wound about the layer of rubber 23 is a coil spring 24, like the other springs. Wrapped around the spring 24 is a layer 25 of soft rubber cooperating with the layer of rubber 23 to embed the spring. The layers 23 and 25 of rubber are like the other rubber layers and wrapped around the layer 25 is a layer 26 of fabric. Wrapped around the layer 26 of fabric is a layer 27 of soft rubber, and wrapped around the layer 27 is a layer 28 of fabric forming a cover for the cushioning element.

Figure 3:
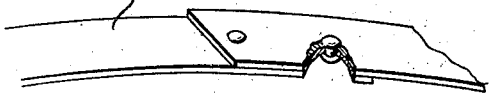
Figure 3 is a fragmentary perspective view showing the manner in which the ends of the tie strap are connected.

Filling the tube formed centrally of the cushioning element by the layer 10 of fabric, is a core 29 of soft rubber and embedded in the core are concentric inner and outer reinforcing rings 30 which are also of soft rubber. Embedded in the core to lie midway between the rings 30 is a resilient metallic tie strap 31, the ends of which are, as shown in Figure 3, riveted together. The tie strap thus provides a continuous annular band disposed in concentric relation to the reinforcing rings 30, and wrapped about the strap is a fabric envelop or sheath 32 of superposed layers.

Formed about the cushioning element is a rubber carcass 33. In the present instance, we have shown the carcass as composed exclusively of rubber but it is to be understood that this carcass may, if desired, be formed of rubber and fabric laminations. The carcass is vulcanized about the cushioning element and the vulcanizing of the carcass will, of course, also serve to vulcanize the rubber layers of the cushioning element as well as the rubber of the core 29 and reinforcing rings 30 so that a homogenous structure is produced. Supporting the carcass is a channel shaped band 34 having side flanges 35 to engage beads 36 at the base of the carcass. Preferably, the carcass is vulcanized on the said band and, as will be observed the band is shaped to provide a demountable wheel rim so that the tire may be readily applied to wheel or removed therefrom.

As will now be seen, the springs 12, 16, 21 and 24 of the cushioning element will impart resiliency to the tire while said springs will be braced and supported internally by the yieldable core 29. The core, in turn, will be braced and reinforced by the rings 30, which will tend to prevent undue lineal stretching of the core adjacent the inner and outer peripheries thereof. Furthermore, the core will be braced and supported by the tie strap 31, which will also tend to prevent undue lineal stretching of the core and since the strap is rigidly connected at its ends, said strap will also tend to prevent undue lateral distortion of the springs of the cushioning element. As will be observed the sheath 32 of the tie strap serves to isolate said strap from the core so that the strap is not connected directly to the core. Accordingly, limited individual flexing of the strap will be permitted within the sheath, so that the strap may readily yield to conform the flexing of the springs of the cushioning element.

Having thus described the invention, what we claim is:

1. A resilient tire including a tubular cushioning element composed of layers of fabric wrappings and intervening pairs of contacting rubber wrappings embedding spirally wound springs therebetween, a yieldable core filling said element, and a carcass enclosing said element.

2. A resilient tire, comprising a core of soft rubber having a metal strap inserted therein between concentric reinforcing rings, alternate layers of fabric and rubber enveloping the core, the layers of rubber having spirally wound springs embedded therein, and a carcass enclosing the several layers of fabric and rubber.

3. A resilient tire including a tubular cushioning element composed of layers of fabric wrappings and intervening pairs of contacting rubber wrappings embedding spirally wound springs therebetween, a yieldable core filling said element, an annular metallic tie strap embedded in the core, yieldable reinforcing rings embedded in the core near the inner and outer peripheries thereof, a sheath enclosing the strap and isolating the strap for limited independent flexing movement, and a carcass enclosing said element.

In testimony whereof we affix our signatures.

WILBER S. BISEL. [L. S.]
GEORGE BAUDRY. [L. S.]